(12) United States Patent
Sasaki et al.

(10) Patent No.: US 6,762,811 B2
(45) Date of Patent: Jul. 13, 2004

(54) LAMINATED QUARTER-WAVE PLATE OR CIRCULARLY POLARIZING PLATE, LIQUID-CRYSTAL DISPLAY DEVICE USING THE SAME AND METHOD FOR PRODUCING THE SAME

(75) Inventors: Shinichi Sasaki, Ibaraki (JP); Takashi Yamaoka, Ibaraki (JP); Hiroyuki Yoshimi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 31 days.

(21) Appl. No.: 10/261,505

(22) Filed: Oct. 2, 2002

(65) Prior Publication Data

US 2003/0067574 A1 Apr. 10, 2003

(30) Foreign Application Priority Data

Oct. 3, 2001 (JP) .................................... P2001-307749

(51) Int. Cl.$^7$ ............................................ G02F 1/1333
(52) U.S. Cl. ....................... 349/118; 349/122; 349/98
(58) Field of Search .................................. 349/117, 118, 349/119, 122, 98

(56) References Cited

U.S. PATENT DOCUMENTS 6,339,501 B1 * 1/2002 Kameyama et al. ........ 359/485
6,340,999 B1 * 1/2002 Masuda et al. ............... 349/63
6,650,382 B1 * 11/2003 Sumida et al. ................ 349/63

* cited by examiner

*Primary Examiner*—Toan Ton
(74) *Attorney, Agent, or Firm*—Sughrue Mion, PLLC

(57) ABSTRACT

A laminated quarter-wave plate having: a laminate of a quarter-wave plate and a half-wave plate, wherein: the quarter-wave plate and the half-wave plate are laminated on each other so that directions of in-plane slow axes intersect each other; and each of the quarter-wave plate and the half-wave plate satisfies a relation $Nz=(nx-nz)/(nx-ny) >1.05$ in which nx and ny are in-plane main refractive indices, and nz is a thickness wise refractive index; and a circularly polarizing plate having: a laminate of a laminated quarter-wave plate defined above and a polarizer.

8 Claims, 1 Drawing Sheet

LAMINATED QUARTER-WAVE PLATE OR CIRCULARLY POLARIZING PLATE, LIQUID-CRYSTAL DISPLAY DEVICE USING THE SAME AND METHOD FOR PRODUCING THE SAME

The present application is based on Japanese Patent Application No. 2001-307749, which is incorporated herein by reference.

BACKGROUND OF THE INVENTION

1. Field of the Invention

The present invention relates to a laminated quarter-wave plate or a circularly polarizing plate adapted to compensation for birefringence, a liquid-crystal display device using the same and a method for producing the same.

2. Description of the Related Art

As a wave plate capable of providing a retardation of a quarter wavelength in a wide wavelength range of visible light, there is known a laminated quarter-wave plate in which a quarter-wave plate and a half-wave plate produced by uniaxial stretching are laminated on each other so that directions of in-plane slow axes of these plates intersect each other. For example, the laminated quarter-wave plate is widely used for the purpose of anti-reflection of a liquid-crystal display device (hereinafter referred to as "LCD").

A TFT (Thin Film Transfer) drive type twisted nematic (TN) LCD is widely used in a notebook type personal computer, a monitor, etc. The TN-LCD has a disadvantage in that the viewing angle thereof is narrow. A VA- or IPS-LCD capable of providing a wide viewing angle have been developed and begun to be popularized for monitor use. The VA- or ISP-LCD, however, needs backlight electric power because the VA- or ISP-LCD is lower in luminance than the TN-LCD. Moreover, the VA- or ISP-LCD has been not applied to a notebook type personal computer requiring low electric power consumption.

On the other hand, it is known that frontal luminance of a multi-domain VA-LCD is improved when the laminated quarter-wave plate is disposed in one interlayer between a liquid-crystal cell and a polarizer while a laminated quarter-wave plate capable of providing circularly polarized light of reverse rotation is disposed in another interlayer. In this method, it is however difficult to obtain a wide viewing angle. This problem can be solved by the related art when a negative uniaxial phase retarder produced by biaxial stretching and a polarizer are laminated on each other. There is, however, a disadvantage in that the resulting film is made thick because a large number of plates must be laminated as well as production efficiency is made low because a large number of laminating steps is required.

SUMMARY OF THE INVENTION

To solve the problems in the related art, on object of the invention is to provide a quarter-wave plate or a circularly polarizing plate adapted to compensation for birefringence, a liquid-crystal display device using the same and a method for producing the same.

In order to solve the object, according to the invention, there is provided a laminated quarter-wave plate having: a laminate of a quarter-wave plate and a half-wave plate, wherein: the quarter-wave plate and the half-wave plate are laminated on each other so that directions of in-plane slow axes intersect each other; and each of the quarter-wave plate and the half-wave plate satisfies a relation $Nz=(nx-nz)/(nx-ny)>1.05$ in which nx and ny are in-plane main refractive indices, and nz is a thicknesswise refractive index. Further, according to the invention, there is provided a circularly polarizing plate having: a laminate of a laminated quarter-wave plate defined above and a polarizer.

Further, according to the invention, there is provided a pressure sensitive adhesive agent-including laminated quarter-wave plate having: a laminated quarter-wave plate defined above; and a pressure sensitive adhesive layer provided on at least one of opposite surfaces of the laminated quarter-wave plate.

Further, according to the invention, there is provided a pressure sensitive adhesive agent-including circularly polarizing plate having: a circularly polarizing plate defined above; and a pressure sensitive adhesive layer provided on at least one of opposite surfaces of the circularly polarizing plate.

Further, according to the invention, there is provided a liquid-crystal display device having: a liquid-crystal cell; and a laminated quarter-wave plate or circularly polarizing plate defined above, or a pressure sensitive adhesive agent-including laminated quarter-wave plate or circularly polarizing plate defined above and disposed on at least one of opposite surfaces of the liquid-crystal cell.

Next, according to the invention, there is provided a method of producing a phase retarder (such as a quarter-wave plate or a half-wave plate) satisfying a relation $Nz=(nx-nz)/(nx-ny)>1.05$ in which nx and ny are in-plane main refractive indices, and nz is a thicknesswise refractive index, the method having the step of: stretching a transparent polymer film with a thickness of 5 to 500 $\mu$m by one of tenter lateral stretching and biaxial stretching.

Features and advantages of the invention will be evident from the following detailed description of the preferred embodiments described in conjunction with the attached drawings.

DETAILED DESCRIPTION OF THE PREFERRED EMBODIMENTS

Figure 1:
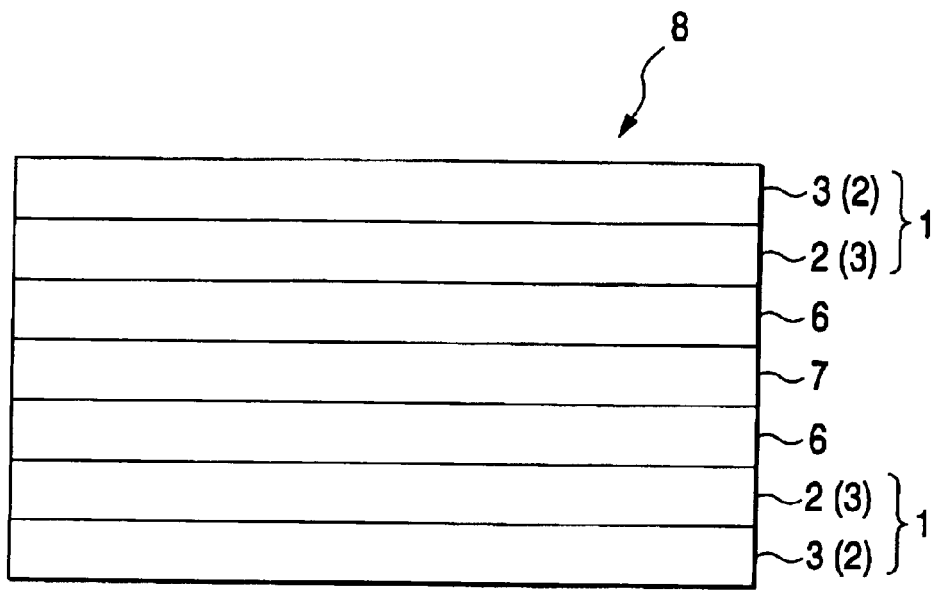
FIG. 1 is a sectional view of an embodiment of a liquid-crystal display device.
Figure 2:
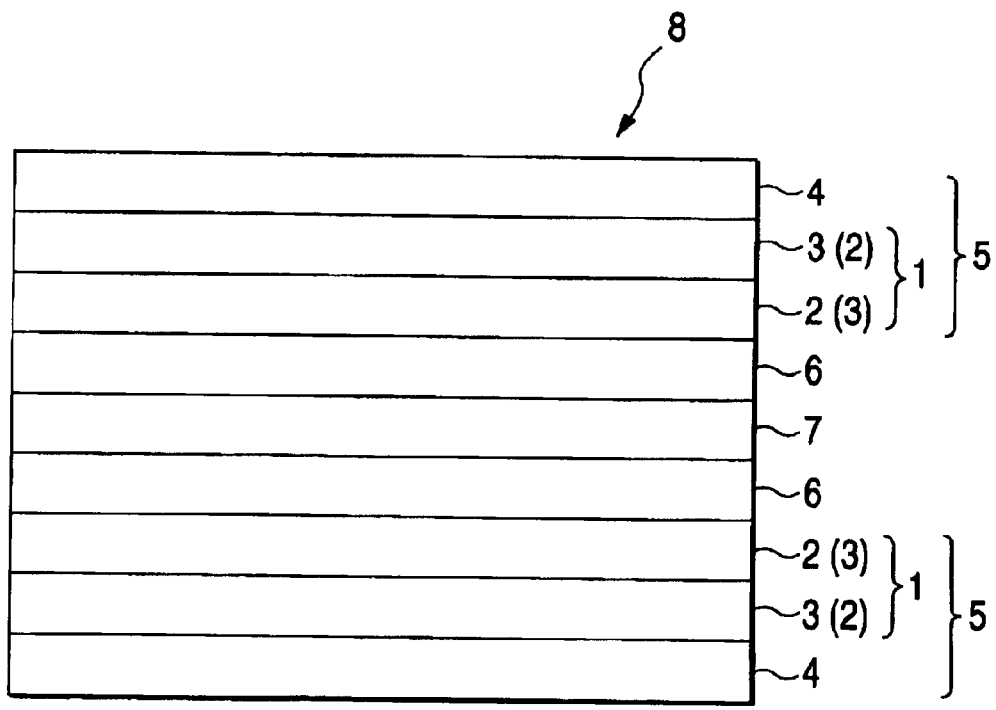
FIG. 2 is a sectional view of another embodiment of a liquid-crystal display device.

As shown in FIGS. 1 and 2, the laminated quarter-wave plate 1 according to the invention has a laminate of a quarter-wave plate 2 and a half-wave plate 3. The quarter-wave plate 2 and the half-wave plate 3 are laminated on each other so that directions of in-plane slow axes intersect each other, and each of the quarter-wave plate 2 and the half-wave plate 3 satisfies a relation $Nz=(nx-nz)/(nx-ny)>1.05$ in which nx and ny are in-plane main refractive indices, and nz is a thicknesswise refractive index. nx is an in-plane refractive index in the direction in which the in-plane refractive index becomes maximum within the plane of the plate, and ny is an in-plane refractive index in the direction orthogonal to the direction of nx.

Materials of the quarter-wave plate and the half-wave plate are not particularly limited but materials excellent in birefringence controllability, transparency and heat resistance may be preferably used. Polymer films produced by an extrusion or cast film-forming method are preferably used from the point of view of reducing variation in birefringence. Examples of polymer for forming such polymer films include polyolefin (polyethylene, polypropylene, etc.), polynorbornene-based polymer, polyvinyl chloride, polystyrene, polyacrylonitrile, polycarbonate, polyester, polysulfone, polyallylate, polyvinyl alcohol, polymethacrylate ester, polyacrylate ester, cellulose ester, and so on. Particularly, polynorbornene-based polymer, polycarbonate, polyester, polysulfone and polyallylate are preferred from the point of view of birefringence controllability, birefringence uniformity, transparency and heat resistance. As each of the polymer films, a film having a thickness of not larger than 3 mm, particularly in a range of from 1 μm to 1 mm, more particularly in a range of from 5 to 500 μm is generally used from the point of view of obtaining a homogeneous stretched film by a stable stretching process.

The method of generating a retardation is not particularly limited. A general stretching process such as uniaxial stretching or biaxial stretching can be used as the method. To obtain a quarter-wave plate and a half-wave plate satisfying the relation $Nz=(nx-nz)/(nx-ny)>1.05$, tenter lateral stretching or biaxial stretching is preferably used. The biaxial stretching may be either simultaneous biaxial stretching using a full tentering method or successive biaxial stretching using a roll tentering method. Stretching conditions such as stretching temperature, stretching rate, stretching magnification, etc. are not determined because optimal conditions vary in accordance with the kind of the polymer film used, the thickness thereof, and so on. It is however preferable that the stretching temperature is near to or not lower than the glass transition point (Tg) of the polymer film used. The stretching magnification varies in accordance with the stretching method, etc. but it is preferable that the polymer film is stretched laterally by a stretching magnification of 50 to 200% or biaxially stretched by a stretching magnification of 50 to 200% in a main stretching direction to thereby form a quarter-wave plate or a half-wave plate. Incidentally, the "stretching magnification of 100%" means a state in which a non-stretched film is stretched to twice.

The thickness of the quarter-wave plate or the half-wave plate is not particularly limited and can be determined suitably in accordance with the purpose of use. Generally, the thickness is set to be not larger than 1 mm, preferably in a range of from 1 to 500 μm, more preferably in a range of from 5 to 300 μm. The quarter-wave plate and the half-wave plate produced in this manner are laminated on each other so that the in-plane slow axes of the two plates intersect each other. Thus, a laminated quarter-wave plate is obtained. The laminating method is not particularly limited. Any suitable material such as an adhesive agent, or a pressure sensitive adhesive agent can be used if the material is high in transparency.

The material of a polarizer 4 in FIG. 2 is not particularly limited. Any known material in the related art can be used as the material of the polarizer. Generally, the polarizer is provided as a plate having a polarization film and a transparent protective film as a protective layer bonded to one or each of opposite surfaces of the polarization film through a suitable adhesive layer.

The material of the polarization film is not particularly limited. Examples of the material of the polarization film include: a polarization film obtained by stretching a hydrophilic polymer film such as a polyvinyl alcohol (PVA)-based film, a partially formalized polyvinyl alcohol-based film or an ethylene-vinyl acetate copolymer-based partially saponified film after adsorbing iodine and/or dichromatic dye onto the hydrophilic polymer film; and a polarization film formed from a polyene-oriented film such as a dehydrate of polyvinyl alcohol or dehydrochlorinate of polyvinyl chloride. Especially, a polyvinyl alcohol-based film containing iodine or dichromatic dye adsorbed thereon and oriented is preferred. The thickness of the polarization film is not particularly limited but is generally preferably set to be in a range of from 1 to 80 μm, particularly in a range of from 2 to 40 μm.

A suitable transparent film can be used as the material of the protective film provided as a transparent protective layer provided on one or each of opposite surfaces of the polarization film. Especially, a film of a polymer excellent in transparency, mechanical strength, thermal stability and moisture sealability is preferably used. Examples of the polymer include: an acetate-based resin such as triacetyl cellulose; and a polymer selected from the materials listed above in the description of the quarter-wave plate and the half-wave plate. The polymer is, however, not limited thereto. The protective layer may contain fine particles so that a surface of the protective layer is formed to have a finely roughened structure.

The transparent protective film which can be particularly preferably used from the point of view of polarizing characteristic, durability, etc. is a triacetyl cellulose film having a surface saponified with alkali. The thickness of the transparent protective film is optional. Generally, the thickness of the transparent protective film is set to be not larger than 500 μm, preferably in a range of from 5 to 300 μm, more preferably in a range of from 5 to 150 μm for the purpose of reducing the thickness and size of the polarizer. Incidentally, when transparent protective films are provided on opposite surfaces of the polarization film, transparent protective films of polymers different between the front and the rear may be used.

The process of bonding the polarization film and the transparent protective film as a protective layer to each other is not particularly limited. For example, the bonding process can be performed through an adhesive agent of an acryl-based polymer or a vinyl alcohol-based polymer or through an adhesive agent at least containing an aqueous crosslinking agent for the vinyl alcohol-based polymer such as boric acid, borax, glutaraldehyde, melamine or oxalic acid. By such an adhesive agent, the transparent protective film can be prevented from being peeled because of the influence of humidity and heat, so that the transparent protective film can be formed as a film excellent in light transmittance and the degree of polarization. Such an adhesive layer is formed as a layer obtained by applying an aqueous solution and drying the aqueous solution in accordance with necessity. When the aqueous solution is prepared, another additive and a catalyst such as acid may be mixed with the aqueous solution. Particularly an adhesive agent made from polyvinyl alcohol is preferably used because the adhesive agent is excellent in adhesion to a PVA film.

The method of laminating the polarizer 4 and the laminated quarter-wave plate 1 to produce a circularly polarizing plate 5 in FIG. 2 is not particularly limited. A suitable material such as an adhesive agent or a pressure sensitive adhesive agent can be used if the material is high in transparency. The quarter- or half-wave plate may be used as a layer for protecting a polarizer so that the other, half- or quarter-wave plate can be bonded and laminated on the polarizer through an adhesive agent or a pressure sensitive adhesive agent. Then, only an ordinary protective film is bonded to the other side on which the half- or quarter-wave plate is not bonded. In the case of such a method, a wave plate satisfying the relation $Nz=(nx-nz)/(nx-ny)>1.05$ is used as the protective film provided on one side of the polarizer.

The adhesive agent (pressure sensitive adhesive agent) used for lamination of the quarter-wave plate and the half-wave plate or lamination of the laminated quarter-wave plate and the polarizer is not particularly limited. An adhesive agent not requiring any high-temperature process for curing or drying or an adhesive agent not requiring any long-term curing or drying process is preferably used from the point of view of preventing the optical characteristic of the polarizer from changing. Further, an adhesive agent prevented from peeling under heating and humidifying conditions is preferably used. For example, a transparent pressure-sensitive adhesive agent such as an acryl-based adhesive agent, silicone-based adhesive agent, a polyester-based adhesive agent, a polyurethane-based adhesive agent, a polyether-based adhesive agent or a rubber-based adhesive agent may be used.

A pressure sensitive adhesive layer 6 may be provided on the laminated quarter-wave plate 1 or the circularly polarizing plate 5 so that the laminated quarter-wave plate 1 or the circularly polarizing plate 5 can be bonded to another member such as a liquid-crystal cell 7. The pressure sensitive adhesive layer 6 can be formed from a suitable pressure sensitive adhesive agent according to the related art such as the acryl-based trackifier. When the pressure sensitive adhesive layer 6 provided on the laminated quarter-wave plate 1 or the circularly polarizing plate 5 is exposed to the surface, the pressure sensitive adhesive layer 6 may be preferably covered with a separator for the purpose of preventing contamination until the pressure sensitive adhesive layer 6 is put into practical use. The separator can be formed from a suitable leaf body of a material selected from materials listed in the description of the transparent protective film. If necessary, a release coat made from a suitable releasant such as a silicone-based releasant, a long-chain alkyl-based releasant, a fluorine-based releasant or a molybdenum sulfide releasant may be provided on the suitable leaf body.

Incidentally, each of layers such as the laminated quarter-wave plate, the polarization film, the transparent protective layer, the pressure sensitive adhesive layer, etc., may be treated with an ultraviolet absorbent such as a salicylic ester-based compound, a benzophenol-based compound, a benzotriazole-based compound, a cyanoacrylate-based compound or a nickel complex salt-based compound so that the layer has ultraviolet absorptive power.

The laminated quarter-wave plate or the circularly polarizing plate according to the invention is effectively used as a quarter-wave plate or a circularly polarizing plate in a multi-domain VA-LCD. In practical use, the laminated quarter-wave plate or the circularly polarizing plate may be formed successively and individually by lamination in the process for production of each display device. Alternatively, the laminated quarter-wave plate or the circularly polarizing plate may be laminated in advance. In this case, there is an advantage in that both quality stability and laminating workability are so excellent that efficiency in production of each display device can be improved.

The laminated quarter-wave plate or the circularly polarizing plate according to the invention can be used for forming various kinds of liquid-crystal display devices 8. Particularly light leakage caused by birefringence of a liquid-crystal cell, light leakage generated in cross-Nicol polarizers and color shifting which have heretofore occurred in a VA mode liquid-crystal display device can be reduced. Thus, a liquid-crystal display device having a wide viewing angle in all azimuths can be obtained. Incidentally, when the laminated quarter-wave plate or the circularly polarizing plate according to the invention is mounted on a liquid-crystal cell, it is necessary to perform design in consideration of birefringence based on orientation of liquid crystal and it is therefore necessary to suitably adjust the retardation value of the wave plate and the angle of intersection between the wave plate and the polarizer.

Further, for formation of the liquid-crystal display device, at least one layer of a suitable component such as a prism array sheet, a lens array sheet, a light-diffusing plate or a backlight unit may be disposed in a suitable position.

The invention will be described below more specifically in connection with Examples 1 and 2 and Comparative Examples 1 to 3.

EXAMPLE 1

A 100 μm-thick norbornene film (trade name "Arton Film" made by JSR Corporation) was stretched widthwise by 130% by a tenter at a temperature of 175° C. to thereby obtain a 44 μm-thick quarter-wave plate. On the other hand, the same 100 μm-thick norbornene film as described above was successively biaxially stretched lengthwise by 90% and widthwise by 5% by a roll tentering system at a temperature of 175° C. to thereby obtain a 70 μm-thick half-wave plate. Then, the quarter-wave plate and the half-wave plate were laminated on each other so that the slow axis of the quarter-wave plate makes 20° in a counterclockwise direction whereas the slow axis of the half-wave plate makes 67.5° in a clockwise direction. Thus, a laminated quarter-wave plate was obtained. Finally, linearly polarizing plates (trade name "NRF" made by Nitto Denko Corporation) were laminated on the laminated phase retarder so that the absorption axes of the linearly polarizing plates make 0° and 90° respectively. Thus, a right-hand circularly polarizing plate and a left-hand circularly polarizing plate were obtained.

Comparative Example 1

A 100 μm-thick norbornene film the same as used in Example 1 was stretched lengthwise by 25% at a temperature of 175° C. to thereby obtain a 91 μm-thick quarter-wave plate. On the other hand, the same 100 μm-thick norbornene film as described above was stretched lengthwise by 80% at a temperature of 175° C. to thereby obtain a 78 μm-thick half-wave plate. Then, the quarter-wave plate and the half-wave plate were laminated on each other so that the slow axis of the quarter-wave plate makes 20° in a counterclockwise direction whereas the slow axis of the half-wave plate makes 67.5° in a clockwise direction. Thus, a laminated quarter-wave plate was obtained. Finally, linearly polarizing plates the same as used in Example 1 were laminated on the laminated phase retarder so that the absorption axes of the linearly polarizing plates make 0° and 90° respectively. Thus, a right-hand circularly polarizing plate and a left-hand circularly polarizing plate were obtained.

Values of Nz in the quarter-wave plates and the half-wave plates obtained in Example 1 and Comparative Example 1 were measured with KOBRA-21ADH which was made by Oji Scientific Instruments and which used a parallel nicol rotary method as a principle. Results of the measurement were as shown in Table 1.

TABLE 1

| | Nz (quarter-wave plate) | Nz (half-wave plate) |
|---|---|---|
| Example 1 | 1.50 | 1.15 |
| Comparative Example 1 | 1.01 | 1.02 |

EXAMPLE 2

The right-hand circularly polarizing plate and the left-hand circularly polarizing plate obtained in Example 1 were disposed on opposite sides of a multi-domain VA type cell to thereby obtain a liquid-crystal display device.

Comparative Example 2

The right-hand circularly polarizing plate and the left-hand circularly polarizing plate obtained in Comparative Example 1 were disposed on opposite sides of a multi-domain VA type cell to thereby obtain a liquid-crystal display device.

Comparative Example 3

Linearly polarizing plates (the same as used in Example 1) were disposed on opposite sides of a multi-domain VA type cell to thereby obtain a liquid-crystal display device.

In each of the liquid-crystal display devices obtained in Example 2 and Comparative Examples 2 and 3, frontal luminance and viewing angles in Co≧10 in accordance with azimuth angles Φ of 45°, 135°, 225° and 315° were measured with EZ-contrast (made by Eldim). Incidentally, luminance was normalized on the assumption that luminance in Comparative Example 3 was regarded as 100. Results of the measurement were as shown in Table 2.

TABLE 2

| | Frontal Luminance | Viewing angle | | | |
|---|---|---|---|---|---|
| | | Φ = 45° | 135° | 225° | 315° |
| Example 2 | 130 | 60 | 65 | 60 | 65 |
| Comparative Example 2 | 130 | 40 | 40 | 40 | 40 |
| Comparative Example 3 | 100 | 30 | 30 | 30 | 30 |

It is obvious from results in Table 2 that frontal luminance is improved and a liquid-crystal display device with a wide viewing angle is obtained when circularly polarizing plates using laminated quarter-wave plates according to the invention are used in the liquid-crystal display device.

As described above, the laminated quarter-wave plate and the circularly polarizing plate according to the invention can be produced easily and inexpensively, so that productivity is excellent. When the laminated quarter-wave plate or the circularly polarizing plate is mounted on a liquid-crystal display device, frontal luminance can be improved so that the liquid-crystal display device can be achieved as a liquid-crystal display device with a wide viewing angle. Moreover, when the laminated quarter-wave plate or the circularly polarizing plate is mounted on a VA mode liquid-crystal display device, the liquid-crystal display device can be provided as a VA-LCD excellent in visibility. Accordingly, the invention is of great industrial value.

This invention should not be limited to the embodiments described above. Various modifications can be included in this invention within a range which can be easily realized by those skilled in the art without departing from the spirit of the scope of claim.

What is claimed is:

1. A laminated quarter-wave plate comprising:

a quarter-wave plate; and a half-wave plate laminated on said quarter-plate, so that directions of in-plane slow axes of said plates intersect each other;

wherein each of said quarter-wave plate and said half-wave plate satisfies a relation $Nz=(nx-nz)/(nx-ny) >1.05$ in which nx and ny are in-plane main refractive indices, and nz is a thicknesswise refractive index.

2. A circularly polarizing plate comprising:

a laminated quarter-wave plate according to claim 1 and a polarizer laminated on said laminated quarter-wave plate.

3. A laminated quarter-wave plate according to claim 1, further comprising a pressure sensitive adhesive layer provided on at least one of opposite surfaces of said laminated quarter-wave plate.

4. A circularly polarizing plate according to claim 2, further comprising a pressure sensitive adhesive layer provided on at least one of opposite surfaces of said circularly polarizing plate.

5. A liquid-crystal display device comprising:

a liquid-crystal cell; and a laminated quarter-wave plate according to claim 1 and disposed on at least one of opposite surfaces of said liquid-crystal cell.

6. A liquid-crystal display device comprising:

a liquid-crystal cell; and a laminated quarter-wave plate according to claim 3 and disposed on at least one of opposite surfaces of said liquid-crystal cell.

7. A liquid-crystal display device comprising:

a liquid-crystal cell; and a circularly polarizing plate according to claim 2 and disposed on at least one of opposite surfaces of said liquid-crystal cell.

8. A liquid-crystal display device comprising:

a liquid-crystal cell; and a circularly polarizing plate according to claim 4 and disposed on at least one of opposite surfaces of said liquid-crystal cell.

* * * * *